Patented Apr. 29, 1947

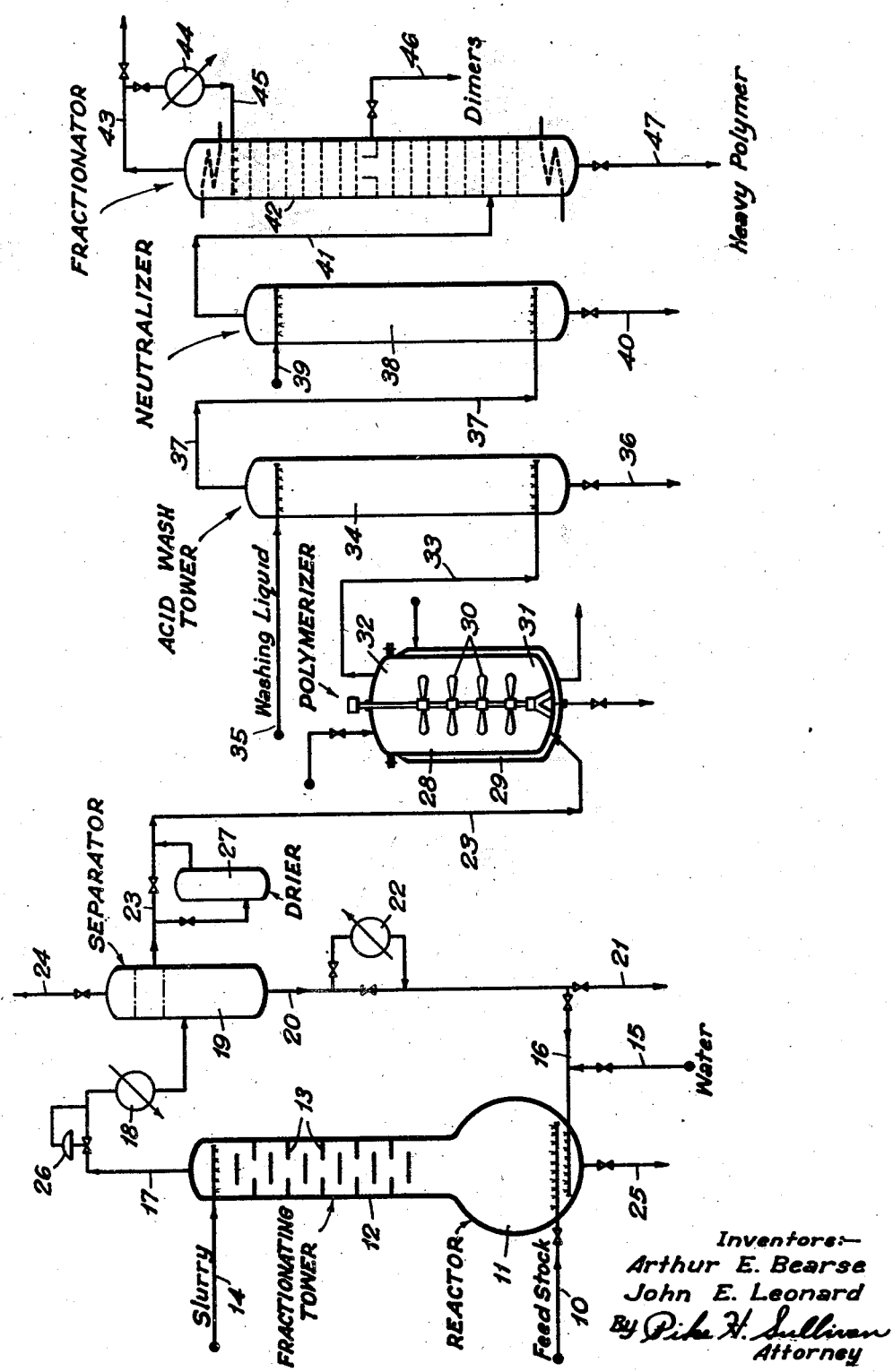

2,419,668

UNITED STATES PATENT OFFICE 2,419,668

PROCESS FOR PREPARING A METHYL-CYCLOPENTENE DIMER

Arthur E. Bearse and John E. Leonard, Columbus, Ohio, assignors, by mesne assignments, to Standard Oil Company, Chicago, Ill., a corporation of Indiana Application November 20, 1944, Serial No. 564,390

7 Claims. (Cl. 260—666)

This invention relates to a novel composition of matter and a process for producing the same. More particularly it relates to a dimer of methylcyclopentene and processes for producing the same.

An object of this invention is to provide a process for producing methylcyclopentene dimers. An additional object is to produce compounds having high value as chemical raw materials. Still another object of this invention is to produce valuable components for safety fuels. Further objects will become apparent as the description of the invention proceeds.

According to this invention, methylcyclopentenes can be polymerized to a dimeric composition having the elementary molecular formula $C_{12}H_{20}$, being a clear, colorless liquid boiling in the range of 214-216° C. at a pressure of 749 mm. of mercury, having a refractive index ($n_D^{20}$) of about 1.495 and a specific gravity of about 0.88. It has a pleasant, camphoraceous odor. It is insoluble in water and 85% phosphoric acid, soluble in diethylether and partially soluble in 95% sulfuric acid with some decomposition.

Methylcyclopentenes for use as a feed stock in preparing dimer composition can be obtained in a variety of ways. Thus, they can be prepared by dehydrohalogenation of methylcyclopentyl halides, e. g., methylcyclopentyl chlorides. Dehydrohalogenation may be effected by refluxing a methylcyclopentyl halide with water or by treatment with alkalies, alkali-acting salts, such as sodium acetate, or by combinations of alkalies and salts; suitable temperatures lie in the range of about 150 to 300° C. Also, hydrogen halides may be split off by thermal treatment of the methylcyclopentyl halide in the vapor phase with or without catalysts or contact substances such as active carbon, Activated Alumina, clays, zeolites, natural or synthetic aluminosilicates, glass or porcelain spheres or chips, soda-lime, copper chlorides, calcium chloride, barium chloride, and the like; suitable temperatures lie in the range of about 100 to 500° C.

Methylcyclopentenes can also be prepared by dehydration of methylcyclopentanols. Dehydration may be suitably effected by treatment in the vapor phase with catalysts such as Activated Alumina (gamma alumina), hydrosilicates, aluminum phosphates and the like. If desired, dehydration of methylcyclopentanols and dimerization of the dehydration products may be effected in one operation, using a catalyst which is suitable for both purposes, e. g., sulfuric and phosphoric acids, in which event it is intermittently or continuously desirable to fortify the acids against excessive dilution by water formed in the reaction zone.

Methylcyclopentenes can be polymerized to the dimer stage by treatment with acidic polymerization catalysts, using temperatures within the range of about 0 to 150° C. Sulfuric acid and phosphoric acid are suitable dimerization catalysts. Experiments have been carried out with both 50 and 75% sulfuric acid at temperatures of 0°, 24°, and 50° C. When 75% sulfuric acid was used at 0° C. the yield of dimer was 63%/pass, 70% ultimate. Sulfuric acid having a concentration in the range of about 35 to about 100% can be used and the reaction controlled by controlling the ratio of acid to feed and by controlling the temperature, duration, and intensity of contacting. In one operation, treating methylcyclopentene with 85% phosphoric acid at 75° C. yielded 24% per pass, 55% ultimate, of dimer.

Other olefin polymerization catalysts may be used, e. g., phosphoric acid on supports such as silica, quartz, porcelain, and the like, catalysts of the Friedel-Crafts type, $ZnCl_2$, $AlCl_3$, $HF$, $BF_3$, $FeCl_3$ and $Al_2O_3$-$SiO_2$ catalysts, alone or promoted by small proportions of a hydrogen halide, e. g., HCl, which may be suitably passed in with the feed. Acid treated clays, natural or synthetic zeolites and the like may also be used as polymerization catalysts. The temperature used for producing methylcyclopentene dimers, the contact time and catalyst/feed ratio will naturally vary in individual cases depending upon the activity of the particular catalyst selected for use. Suitable temperatures will generally fall within the range of about 20 to 250° C.

The methylcyclopentene dimers may be subjected to a variety of aftertreatments including fractionation, preferably at low pressures, treatment with adsorbents such as silica gel, Activated Alumina, active carbon, filter clays or the like, or treatment with strong mineral acids, e. g., phosphoric acid, to remove impurities.

A suitable process for preparing methylcyclopentene dimers is shown in the accompanying figure. A methylcyclopentyl halide, e. g., a secondary methylcyclopentyl monochloride or a fraction containing a substantial proportion of such a chloride, is introduced via line 10 into a reactor 11. Reactor 11 comprises a reaction zone which may suitably be in the form of a spherical or cylindrical vessel surmounted by one or more vertical fractionating towers 12, which in turn may be provided with fractionating devices such as metal or ceramic packing materials, bubble cap trays, or the like, indicated generally by 13. The rate of dehydrohalogenation of the methylcyclopentyl halide may be greatly increased by the admission of basic materials to the reaction zone 11. Thus, alkali metal or alkaline earth metal hydroxides, carbonates, or bicarbonates may be admitted in solid form or, preferably, as a solution or slurry in a liquid such as water or a methylcyclopentyl chloride. Solutions or slurries of these basic materials are preferably admitted to reactor 11 via line 14 in the fractionating tower 12. This mode of admitting basic materials to the reactor serves to combat acid corrosion which might otherwise occur in the fractionating tower 12, furnishing excellent contact between the basic material and methylcyclopentyl halide vapors and serves as a refluxing medium to control the temperature in the fractionating tower, while the slurry or solution is heated by direct heat exchange to a suitable reaction temperature.

Water and/or steam is admitted to reactor 11 by lines 15 and 16. The water or steam aids in the removal of hydrogen halides from the methylcyclopentyl halide and serves also to produce a methylcyclopentene - water azeotrope which passes up through tower 12, thence via an overhead line 17 through a cooler 18 and a separating drum 19. In the separating drum a lower layer consisting principally of water is formed and may be recycled to reactor 11 by valved lines 20 and 16 or rejected from the system via line 21. The temperature of the recycled aqueous phase from the separator may be controlled by the proportion of water passed through a by-pass heater 22. The aqueous layer from the separator may be stripped with steam or other stripping medium to recover organic matter therefrom. Normally gaseous materials, e. g., hydrogen halides, are withdrawn from the separator via valved line 24. The upper layer formed in separator 19 comprises principally methylcyclopentene which is withdrawn via line 23. Residual materials may be removed from reactor 11 via valved line 25. A pressure control valve indicated by 26 serves to regulate the back pressure on the reaction and fractionation zones.

Methylcyclopentene withdrawn from separator drum 19 by line 23 is passed to a polymerization reactor 28, preferably after being partially or completely dried, e. g., by ethyleneglycol, silica gel, CaCl2 or the like, in a by-pass drier 27. The polymerization reactor may be provided with an external jacket 29 for the circulation of a temperature-control fluid or may alternatively be provided with internal cooling coils or other means for controlling the polymerization temperature. It is also desirable to provide an efficient agitation means such as a motor-driven paddle stirrer 30 in the polymerization reactor. The methylcyclopentene is discharged into a body of catalyst 31, which may suitably be concentrated sulfuric or phosphoric acids. The upper portion 32 of polymerization reactor 28 serves as a settling zone wherein the acid polymerization catalyst settles by gravity back into layer 31 and a methylcyclopentene polymer layer is formed. The polymer layer is discharged from polymerization reactor 28 via line 33 into the lower portion of an acid wash tower 34, wherein it is contacted with a countercurrent flow of a washing medium such as phosphoric acid having a concentration in the range of about 50 to about 100%, introduced via line 35, to remove colored impurities. Used acid washing medium is withdrawn from tower 34 by valved line 36 and may be recycled with or without preliminary purification and/or fortification. As an alternative to an acid wash, the dimer may be treated with adsorbents such as silica gel, activated carbon, filter clays or the like. The acid treated methylcyclopentene polymer is withdrawn from tower 34 via line 37 and introduced into the lower portion of a tower 38 wherein it is contacted with a countercurrent flow of a neutralizing agent such as aqueous caustic or the like, introduced via line 39. Spent or partially spent neutralizing medium is withdrawn from tower 38 by line 40 and may be recycled with or without preliminary purification and/or fortification. The neutral methylcyclopentyl polymer is withdrawn from tower 38 by line 41 and passed to a fractionating tower 42. Unreacted methylcyclopentene is taken overhead via line 43, whence all or part thereof may be recycled to the polymerization reactor 28 (by lines not shown) or recycled through a condenser 44 and line 45 to the upper portion of fractionating tower 42 to provide reflux therein. A methylcyclopentene dimer fraction boiling in the range of about 214–216° C. at 749 mm. of mercury is removed from fractionating tower 42 via line 46. Higher methylcyclopentene polymers boiling above 216° C. are withdrawn as tower bottoms via line 47 and may be rejected in whole or in part from the system, but at least part thereof is preferably recycled to the polymerization reactor 28. The recycle of high boiling methylcyclopentene polymers to the polymerization zone tends to reduce the continued production of such high boiling polymers with a corresponding increase of the yield of desired methylcyclopentene dimers.

The following example indicates, in illustrative fashion, a suitable method for the preparation of the methylcyclopentene dimers of this invention.

*Example*

Sulfuric acid (75%; 0.3 mole) was warmed to 50° C. and methylcyclopentene (0.244 mole) was added dropwise with vigorous stirring. The time for the complete addition of the olefin was one hour, and the maximum temperature reached was 57° C. The mixture was poured immediately into 200 ml. of cold water, and steam distillation was carried out until all material volatile with steam had been removed. (A small amount of viscous, dark brown oil was not volatile with steam.) The distillate was then saturated with sodium chloride; the nonaqueous layer was separated, dried over anhydrous potassium carbonate, and distilled. Only one fraction was obtained in this distillation and its boiling range was 210–220° C. under a pressure of 747 mm. of mercury.

This fraction was found to be insoluble in water and 85% phosphoric acid, soluble in ether and only partially soluble in 95% H2SO4 with some decomposition. The 85% phosphoric acid clarified this fraction and extracted the colored materials therefrom. After the phosphoric acid treatment, this fraction was redistilled into a narrow boiling range product, distilling at 214–216° C. under a pressure of 749 mm. of mercury. The refractive index of the dimer fraction before phosphoric acid treatment was ($n_D^{20}$) 1.4935 and after phosphoric acid treatment was 1.4956; its specific gravity was approximately 0.88. The product yield was 65% of the theoretical based upon the total starting material.

Compositions prepared in accordance with this invention may be adapted to a wide variety of uses. They constitute a desirable component of solvent compositions, e. g., paint removal solvents, varnish and gum solvents and the like. They may also be used as a component in high flash point safety fuels. Further, the compositions prepared in accordance with this invention may be used per se or in the form of a derivative such as an ester, alcohol, glycol or the like in insect repellant compositions.

The methylcyclopentene dimers of this invention may be converted by known methods to a wide variety of useful chemical derivatives. These include alcohols, glycols, ethers, esters, or sulfur compounds such as sulfonates, thioesters, thioethers, thioglycols, mercaptans or the like. The dimers may be alkylated with aromatics, naphthenes or isoparaffins to produce interesting derivatives. The dimers may also be copolymerized with mono-, di-, or poly-olefinic compounds to produce a wide variety of polymers, synthetic rubber-like materials, plastics and the like.

It will be apparent that this invention provides the art with novel and useful compositions.

We claim:

1. A process for the production of a methylcyclopentene dimer comprising polymerizing a methylcyclopentene in a polymerization zone by means of a sulfuric acid polymerization catalyst, separating methylcyclopentene polymers from the said polymerization zone and fractionating said methylcyclopentene polymers to separate a dimer fraction, boiling in the range of 214–216° C. under the pressure of 749 mm. of mercury.

2. A process for the production of a methylcyclopentene dimer comprising polymerizing a methylcyclopentene in a polymerization zone by means of a sulfuric acid polymerization catalyst, separating methylcyclopentene polymers from the said polymerization zone, extracting said polymers in the liquid phase with a strong phosphoric acid and fractionating said washed polymers to separate a dimer fraction boiling in the range of 214–216° C. under the pressure of 749 mm. of mercury.

3. The process of claim 1 wherein the methylcyclopentene is a secondary methylcyclopentene.

4. A process for the production of a methylcyclopentene dimer, which process comprises polymerizing a methylcyclopentene with sulfuric acid having a concentration between about 35 per cent and about 100 per cent, separating methylcyclopentene polymers from the polymerization reaction mixture and fractionating said polymers to separate a methylcyclopentene dimer fraction.

5. A process for the production of a methylcyclopentene dimer which comprises polymerizing a methylcyclopentene with a sulfuric acid polymerization catalyst at a temperature between about 0° C. and about 150° C., separating methylcyclopentene polymers from the polymerization reaction mixture and fractionating said polymers to separate a methylcyclopentene dimer fraction.

6. A process for the production of a methylcyclopentene dimer which comprises polymerizing a methylcyclopentene with sulfuric acid having a concentration between about 35 per cent and about 100 per cent at a temperature between about 0° C. and about 150° C., separating methylcyclopentene polymers from the polymerization reaction mixture and fractionating said polymers to separate a methylcyclopentene dimer fraction boiling in the range of 214–216° C. under the pressure of 749 mm. of mercury.

7. The process of claim 6 wherein the methylcyclopentene is a secondary methylcyclopentene.

ARTHUR E. BEARSE.
JOHN E. LEONARD.

REFERENCES CITED

The following references are of record in the file of this patent:

UNITED STATES PATENTS

| Number | Name | Date |
| --- | --- | --- |
| 2,131,879 | Ault | Oct. 4, 1938 |
| 2,314,458 | Stahly | Mar. 23, 1943 |
| 2,333,903 | Thomas | Nov. 9, 1943 |

OTHER REFERENCES

Goheen article in Jour. Amer. Chem. Soc.; vol. 62; pages 744–749 (1941).

Zelinskii et al. article in Berichte; vol. 59; pages 2580–2590; 1926.

Schmidt et al. article in Brennstoff-Chemie; vol. 23; pages 235–240; 247–252 (1942). Chem. Abst., vol. 37, p. 4236 (1943).

Hofmann article in Chem. Ztg.; vol. 57; pp. 5 and 6; 1933.